United States Patent [19]

Johnson et al.

[11] 4,321,751
[45] Mar. 30, 1982

[54] DEPTH MEASUREMENTS

[75] Inventors: Dale V. Johnson, Jefferson Parish, La.; Thomas W. Childers, Esher, England

[73] Assignee: Exxon Production Research Company, Houston, Tex.

[21] Appl. No.: 126,096

[22] Filed: Feb. 29, 1980

[51] Int. Cl.³ .................................................. C01B 3/00
[52] U.S. Cl. .................................................. 33/126.5
[58] Field of Search .................... 33/126.5, 125, 126.6, 33/126, 126.4 R, 126.4 A

[56] References Cited

U.S. PATENT DOCUMENTS 1,695,701 12/1928 Steiner et al. ....................... 33/126.5
3,902,361 9/1975 Watson ............................... 33/126 X Primary Examiner—Charles E. Phillips
Attorney, Agent, or Firm—John S. Schneider

[57] ABSTRACT

A method is disclosed for measuring at the water's surface the distance between a submerged wellhead and a downhole tubing hanger located in a subsea well which includes lowering an electrical conductor cable through the wellhead until the weighted lower end of the cable engages the tubing hanger. The cable contains two tools, one of which is capable of emitting an electrical signal for transmission to the surface when the cable is picked up and the lower end of the cable disengages from the hanger and the other of which is capable of emitting another electrical signal when it passes a preselected point in the wellhead. The cable is picked up to generate one signal and raised until the other tool passes the preselected point in the wellhead to generate the other signal. The distance the cable has been raised between emission of the two signals is then added to the known distance between the lower end of the cable and the other tool to determine the distance between the wellhead and the tubing hanger.

13 Claims, 4 Drawing Figures

U.S. Patent  Mar. 30, 1982  4,321,751
FIG. 1.
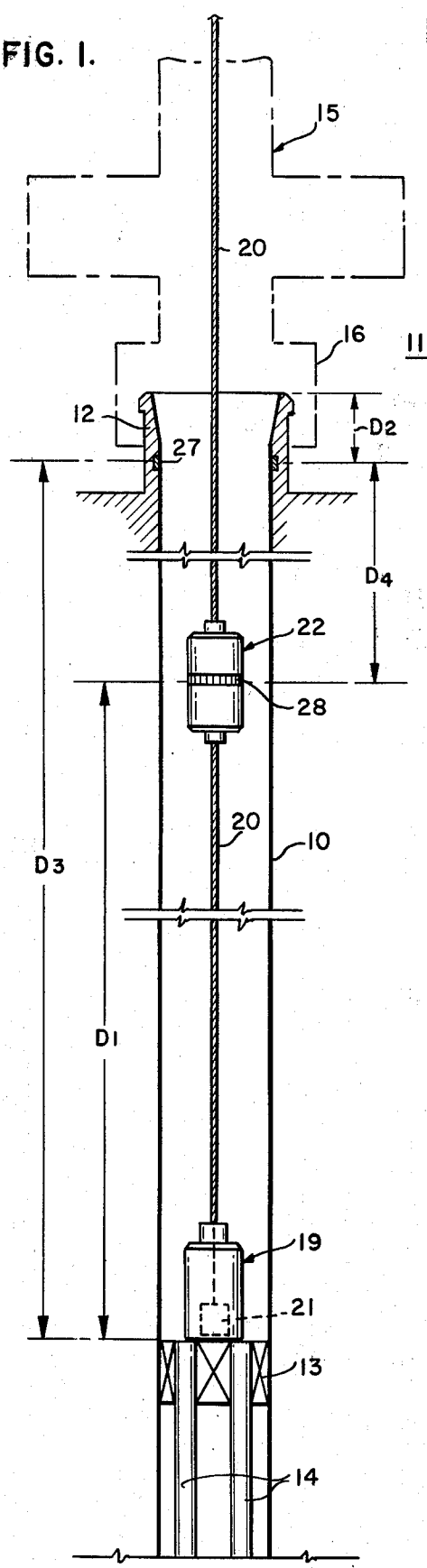
FIG. 2.
FIG. 3.
FIG. 4.
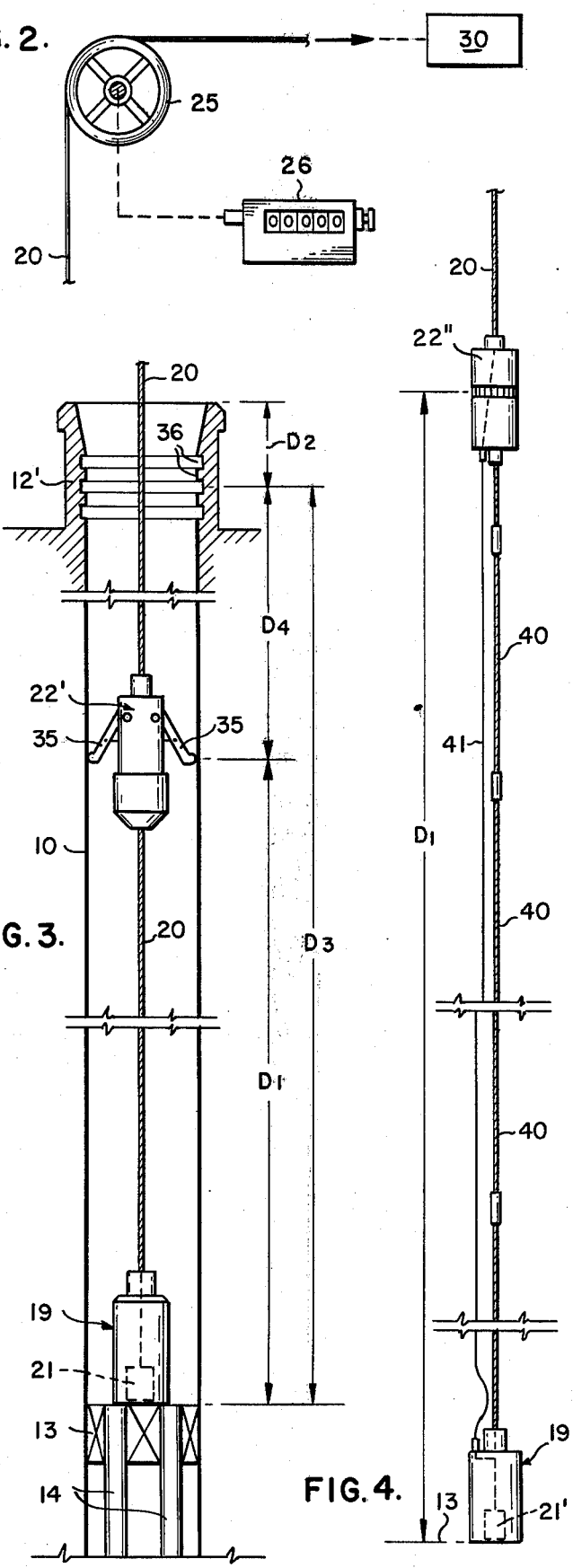

DEPTH MEASUREMENTS

BACKGROUND OF THE INVENTION

This invention concerns measurment of depths in subsea wells and, particularly, measurement of the distance between a submerged wellhead and a downhole tubing hanger. When completing subsea wells, downhole tubing hangers are installed 300 to 700 feet below the wellhead. The tubing between the downhole hanger and the wellhead is run as part of the christmas tree and has a tie-back tool that connects to the downhole hanger. When the christmas tree is latched to the wellhead, the tie-back tool must also make up and latch to the downhole tubing hanger. If the tubing is too short, it will never reach down to the hanger. On the other hand, if the tubing is too long, excessive compressive stresses might be placed in the tubing when the christmas tree is locked down onto the wellhead since the extra length of tubing must be accommodated in the short, 300 to 700 feet, interval. Consequently, it is important to know the exact length of tubing required between the downhole hanger and the wellhead.

One way of determining the length of tubing required has been to run a plate member on drill pipe after the blowout preventers have been removed. The plate is positioned on the drill pipe so that it will land on the wellhead when a protective pad on the drill pipe tags the downhole hanger. The plate is then locked to the drill pipe at that height. The drill pipe is retrieved and the distance between the plate and the protective pad is measured and used to space out the proper tubing length.

That operation is time consuming and exposes the well to undesirable risks, including (1) the potential for damage to the wellhead when stabbing the drill pipe into the open wellhead, (2) the well is open to the sea and totally dependent upon the integrity of the cemented production strings for a considerable length of time, and (3) potential for damage to the downhole hanger by driller error or excessive vessel heave during the tagging of the hanger. Therefore, a means for very accurately measuring the distance between the downhole hanger and the wellhead which avoids the foregoing risks was needed.

One suggested solution to the problem is to run a tool on the lower end of an electric line with the blowout preventers still in place. The tool transmits a signal to the surface when it is lowered to and tags the downhole hanger. Directly reading the amount of cable paid out is not accurate enough because existing surface measurement equipment cannot achieve the accuracy needed. Cable slippage on the measurement sheave is one problem. Even though wave compensation equipment is used on the drill ship, some motion is transmitted downhole to the tool since it is recording over a long distance and time interval. The best accuracy achievable by this method appears to be about one foot.

The method of the present invention achieves the desired measurement accuracy, $\pm\frac{1}{2}$ inch in 700 feet, while avoiding all of the aforementioned risks.

SUMMARY OF THE INVENTION

In accordance with the invention a method is provided for measuring at the water's surface the distance in a well between a point on the wellhead and the level of downhole equipment located in a well pipe which comprises lowering a cable having a weight at its lower end, which may include a first signal-emitting tool, through the wellhead and well pipe until the lower end of the cable is at the level of the equipment, the cable having a second signal-emitting tool located at a point less than but close to the distance between the downhole equipment and the wellhead with at least the length of the cable between the second tool and the surface being an electrical conductor cable; picking up the cable until the lower end of the cable is lifted from the downhole equipment causing thereby a first signal to be emitted and transmitted to the surface; continuing to raise the cable until the second tool passes a preselected point in the wellhead causing thereby a second signal to be emitted and transmitted to the surface. The distance the taut cable has been raised is measured and added to the known distance between the lower end of the cable and the second tool. The first tool may be positioned at any point along the length of the electrical conductor portion of the cable.

As indicated above, the cable may be entirely an electrical conductor cable or a nonconductor line may extend from the second tool to the lower end of the cable. In the latter case a supplementary electrical conductor cable may connect the second tool to the lower end of the cable for transmitting signals to the electrical conductor cable connecting the second tool to the surface. The nonconductor cable may be a set of "pup cables" of various lengths to permit locating the second tool closer to the wellhead. The signal emitters may include collar locators, switch energizing mechanical feelers, magnet responsive devices, or radiation responsive devices.

BRIEF DESCRIPTION OF THE DRAWINGS

FIGS. 1 and 2 schematically illustrate one embodiment of the invention;

FIG. 3 schematically illustrates another embodiment of the invention; and

FIG. 4 schematically illustrates still another embodiment of the invention.

DESCRIPTION OF THE PREFERRED EMBODIMENTS

In FIGS. 1 and 2 there is shown a subsea well pipe 10 extending into the ground underlying water 11 and having a wellhead 12. A downhole hanger 13, from which are suspended two parallel tubing strings 14, is located at a depth of 300–700 feet below wellhead 12. A blowout preventer (BOP) stack is indicated by the dashed lines at 15 and a connector is indicated by dashed lines 16. A signal emitting tool 21, including a housing 19, is attached to the lower end of an electrical conductor cable 20. The tool is of sufficient weight to make the cable taut when the cable is picked up and the tool is lifted from hanger 13. An upper signal emitting tool 22 is affixed to cable 20 near but below wellhead 12 when cable 20 is taut as shown in FIG. 1. Cable 20 extends through connector 16 and BOP stack 15 to the surface of the water where it winds about a length measurement sheave 25 before being wound on a cable reel, not shown. A digital recorder 26 may be used to measure the rotations of measuring sheave 25 and, thereby, the length of cable 20 traversing sheave 25 when cable 20 is pulled up.

The distance $D_1$ between tools 21 and 22 is precisely known. A suitable marker 27 is positioned in wellhead 12 a selected distance $D_2$ from the top thereof. Marker 27 may be magnetic material or radioactive material in the form of a pill or ring which causes a signal to be generated in tool 22 (and transmitted to the surface and registered as at display 30) when the portion 28 of tool 22 passes or reaches marker 27. Bottom tool 21 may be a collar locator capable of generating a signal for transmission to the surface when as cable 20 is picked up and the collar locator is lifted from hanger 13, or the bottom tool may be equipped with a reed switch that generates a signal when the lower end of cable 20 is lifted from hanger 13.

Once tubing hanger 13 has been set and it is desired to run in the tie-back tool connected to the christmas tree, it is important to know precisely the distance $D_3$ from wellhead 12 to hanger 13. To accomplish that determination cable 20 is lowered from a surface vessel or platform, not shown, with tools 21 and 22 attached to it, the latter being attached to cable 20 close to but less than the estimated distance between wellhead 12 and hanger 15. Cable 20 is lowered with the two tools through BOP 13 and wellhead 12 until bottom tool 21 engages downhole hanger 13. Then, cable 20 is picked up to take out any slack in the cable. It is further raised until bottom tool 21 is picked up from tubing hanger 13. At the time bottom tool 21 is just picking up from hanger 13 the distance $D_1$ to top tool 22 is known since that is the specific length of cable installed between the tools. At this action, bottom tool 21 generates a signal the moment it is picked up from downhole hanger 13 which signal is registered at 30. Electrical cable 20 is then picked up until tool 22 causes a signal to be generated and transmitted to display 30 when it passes marker 27. The distance $D_4$ traversed by tool 22 is measured by measurement sheave 25 which gives a digital readout to record distance $D_4$. The total distance $D_3$ is then the sum of the premeasured tool separation $D_1$ plus the distance $D_4$ measured at the surface.

In this manner the cable slippage problem is greatly reduced since instead of actively measuring 700 feet it is only necessary to measure 10 or 20 feet with measurement sheave 25. Also, since the recorded measurement is so short the time interval during which heave could effect such measurement is very much smaller.

As seen in FIG. 3 upper tool 22' may be provided with feelers 35 which would generate signals when engaging grooves 36 formed in wellhead 12'.

A further modification of the invention is illustrated in FIG. 4. Since, in practice, no two hangers will be set at the same level in wells and the closer the cable length is to the actual downhole hanger/wellhead distance the less distance there is to actively measure, cutting the electrical cable and preparing end connections for it upon each application would be required. To avoid cutting and preparing the cable for each application, the cable between the upper tool 22" and the lower tool 21' in housing 19 may comprise a set of "pup cables" 40 having premeasured lengths of 300, 200, 100, 50, 25, 15 and 5 feet. Use of such pup cables allows the tool separation to be within 5 feet of the actual distance from 0–700 feet. However, a nonconductor cable may be used to link the two tools. Also, the lower tool 21' may be a heavy weight equipped with a weight responsive switch. After the weight is lowered and is resting on the downhole hanger, the upper tool 22" is slowly picked up. A nonweight-carrying electrical conductor cable 41 ties the bottom tool 21' to conductor cable 20 for transmitting signals from the signal-producing lower tool 21'. As soon as the heavy weight is picked up from the hanger, the switch sends a signal to the recorder. The weight responsive switch may be located in the upper tool instead which would eliminate the need for the separate conductor line 41. Also, the weight responsive switch may be located at any point along cable 20 or on cables 40 (with a suitable cable 41). When tool 21' is located on the lower end of cables 40, as shown, it may be a collar locator type tool such as tool 21.

The above description of the invention is explanatory only and changes in the details of the apparatus and method described and illustrated may be made by those skilled in the art within the spirit of the appended claims without departing from the invention.

We claim:

1. A method for measuring at the surface the distance between a wellhead and downhole equipment located in a well comprising:
   lowering a cable through said wellhead and into said well until the lower end of said cable rests on said downhole equipment and the cable becomes slack;
   picking up and raising said cable;
   generating a first signal just as said cable becomes taut and the lower end of said cable is raised off of said downhole equipment;
   continuing to raise said cable and generating a second signal when a selected point on said cable passes a selected point in said wellhead;
   measuring the distance said cable has been raised between the occurrence of said first and second signals; and
   adding said distance the cable has been raised to the distance between the lower end of said cable and said selected point on said cable.

2. A method for measuring at the water's surface the distance between a subsea wellhead and a downhole tubing hanger located in a well comprising:
   lowering a cable through said wellhead until the lower end of said cable rests on said tubing hanger;
   picking up and raising said cable;
   generating a first signal just as said cable becomes taut and the lower end of said cable is raised above the level of said tubing hanger;
   continuing to raise said cable and generating a second signal when a selected point on said cable passes a selected point in said wellhead;
   measuring the distance said cable has been raised between the occurrence of said first and second signals; and
   adding said distance the cable has been raised to the distance between the lower end of said cable and said selected point on said cable.

3. A method as recited in claim 2 in which said cable between the lower end of said selected point on said cable comprises a set of pup cables of premeasured selected lengths.

4. A method as recited in claim 2 in which said weight responsive signal emitting tool is located on the lower end of said cable.

5. A method as recited in claim 2 in which said cable contains first and second signal emitting tools, said first signal emitting means comprising a weight-responsive signal emitting tool and said second signal emitting tool being positioned at said selected point on said cable.

6. A method as recited in claim 5 in which said cable extending from said second signal emitting tool to the surface comprises an electrical conductor cable and from said other tool to the lower end of said cable comprises a nonelectrical conductor cable.

7. A method as recited in claim 6 in which a non-weight-carrying electrical conductor line extends from the lower end of said nonconductor cable to said second signal emitting tool.

8. A method as recited in claim 7 in which said one tool comprises a weight-responsive electrical signal emitter.

9. A method as recited in claim 5 in which said entire cable comprises an electrical conductor cable.

10. A method as recited in claim 9 in which at least one of said tools comprises a collar-locator type tool.

11. A method as recited in claim 9 in which said second signal emitting tool includes mechanical feelers capable of engaging the wall of said wellhead.

12. A method as recited in claim 9 in which the signal emitter of said second signal emitting tool is magnet responsive.

13. A method as recited in claim 9 in which the signal emitter of said second signal emitting tool is radiation responsive.

* * * * *